United States Patent [19]

Griffin

[11] Patent Number: 5,029,144
[45] Date of Patent: Jul. 2, 1991

[54] SYNTHETIC APERTURE ACTIVE UNDERWATER IMAGING SYSTEM

[75] Inventor: Maurice J. Griffin, Tiverton, R.I.

[73] Assignee: The United States of America as represented by the Secretary of the Navy, Washington, D.C.

[21] Appl. No.: 548,397

[22] Filed: Jul. 5, 1990

[51] Int. Cl.$^5$ .............................................. G03B 42/06
[52] U.S. Cl. ......................................... 367/11; 367/7
[58] Field of Search ..................... 367/7, 11, 103, 104, 367/105, 138; 364/521, 516; 358/112

[56] References Cited

U.S. PATENT DOCUMENTS 4,768,156  8/1980  Whitehouse et al. ............... 364/521

*Primary Examiner*—Daniel T. Pihulic
*Attorney, Agent, or Firm*—Michael J. McGowan; Prithvi C. Lall

[57] ABSTRACT

An acoustic receiving array synthesized using a single stationary receiving element and a rotating target. Echoes from a highly repeatable transmit pulse are digitized and recorded as the target is rotated. Controlled geometry and essentially stationary channel characteristics eliminate the need for adaptive beamforming techniques. Subsequent to acquisition of the desired data set conventional time delay beam-forming and steering techniques for multi-dimensional arrays are used to focus the array at desired locations. Energy level in a time gate is computed and recorded for each image location. Finally a raster image is generated using the thresholded energy levels.

5 Claims, 2 Drawing Sheets

SYNTHETIC APERTURE ACTIVE UNDERWATER IMAGING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The invention relates to an underwater imaging system for use in controlled environments such as acoustic test facilities. More specifically it employs a single fixed hydrophone receiver location and a rotated target to greatly reduce the amount of acquisition hardware required and can satisfy the fractional wavelength phase coherence requirements for imaging. Since the same test setup, and in many cases even the identical data set, can be used for other test purposes such as target strength measurements, the images can be used to help locate major contributors to target strength, and to indicate the position of the object relative to the data set used for the target strength measurements.

(2) Description of the Prior Art

Acoustic test facilities generally do not have any acoustic imaging capability. The Navy has long used such facilities for target strength measurements, target classification experiments, and acoustic calibrations. It would be advantageous to be able to image the target acoustically with the identical data. In these facilities, tests typically generate recordings of echo data, so that an imaging system based on reflection rather than transmission of sound is desirable. Test sites typically have facilities for accurate placement and recording of only a very small number of hydrophones at one time. Synthesis of the receiving array from a single hydrophone would eliminate the need for substantial redundant hardware.

SUMMARY OF THE INVENTION

Accordingly, it is a general purpose and object of this invention to provide an acoustic imaging system.

It is a further object that this imaging system provide images that can be generated from a single hydrophone recording system.

A still further object is that this imaging system generate images using sonar echoes.

Still another object is that this imaging system be implemented using conventional non-adaptive beamforming techniques.

These objects are accomplished with the present invention by providing an acoustic imaging system including a digital data storage system containing a plurality of recordings of echoes from the target, each recording containing data for a different target aspect. Each data file is treated as a separate virtual array element output signal. Array geometry in a selected frame of reference is synthesized by signal processing using an algorithm based on distance from the hydrophone to the target and the size of the angular increment for each rotation. Array aperture length, and hence angular resolution, can be controlled by choice of the number of virtual elements. Orientation of the image is determined by the set of virtual elements chosen which is in general a subset of all available data. The beam is focused initially to a reference point which is the geometric center of the arc traced by the virtual array. Look-up tables on magnetic media provide input to the system for sound speed, optional spatial weighting coefficients, sample rate, and spatial boundaries on the range of beam steering and spatial increment, as well as the previously computed virtual element location coordinates in the chosen reference frame grid. The beam is steered raster fashion throughout the predetermined spatial coordinate system. A computer algorithm determines the time delays to each virtual element from each point in the image space. At each point in the image space a plurality of summers combines time shifted virtual hydrophone signals and their combined energy is integrated over a predetermined time gate. Output energy levels for each focal point are stored in memory for subsequent thresholding and raster display.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
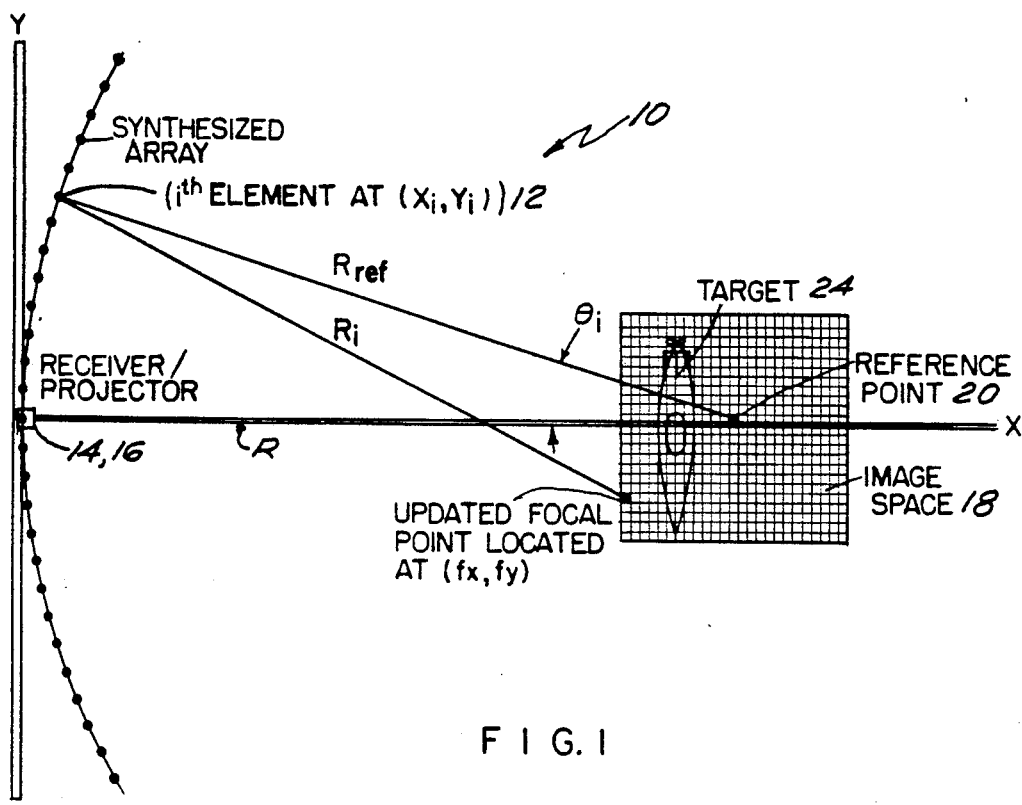
FIG. 1 shows an inverse synthesis of a virtual array ranging to a focal point in a pre-defined image space for the time delay computations.

Referring now to FIG. 1 there is shown a synthesized virtual array 10 in the X-Y coordinate system chosen to describe subject invention. The principle of operation of the present invention is as follows. A plurality of "i" virtual array elements 12 are synthesized using a stationary acoustic transducer 14 and hydrophone 16 pair which may be (but are not necessarily) separated in space. Based on the frame of reference shown in FIG. 1, the positional description of the $i^{th}$ virtual element 12 is defined as:

$$X_i = R(1 - \cos(\theta_i)) \qquad (1)$$

$$Y_i = R\sin(\theta_i) \qquad (2)$$

where R is the radius along the X-axis from the virtual array element to the center of the image space 18 spanned by the time series data gate, $\theta$ is the angle between the X axis and the vector from the center reference point 20 of image space 18 spanned by the time series data gate to the virtual array element, and $X_i$ and $Y_i$ are the Cartesian coordinates of the $i^{th}$ virtual array element 22. The angular increment chosen must be small enough to prevent overlapped latent images (not shown) of a target 24 or aliasing, due to array grating lobes. For a typical hydrophone line array the angular separation of grating lobes, $\phi$, is given by $$\phi = \frac{\lambda}{D} \qquad (3)$$

where $\lambda$ is the wavelength and D is the element spacing. This relationship can be used as an approximation of the latent image angular separation provided that the radius of curvature of the synthesized array is not too small. Data is stored in time gates that are large enough to accommodate the entire target echo for all aspects as the target is rotated.

Figure 2:
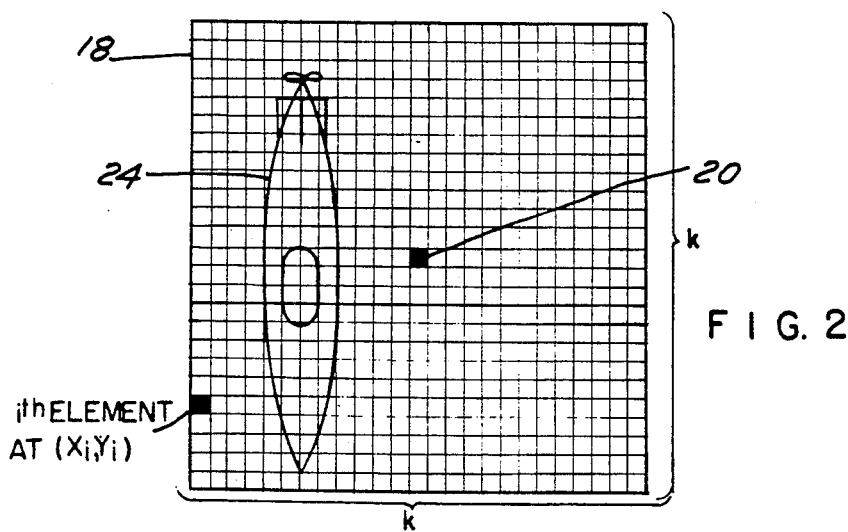
FIG. 2 shows a blown-up view of the pre-selected image space of FIG. 1.

The two dimensional image space 18 of FIGS. 1 and 2 is predefined as a k × k (which equals i) grid that is sized based on the physical size and location of target 24 and the length of the time gates. Sampling rate can be controlled during the test or if hardware limitations preclude sufficient sampling rate, interpolated samples can be synthesized as taught in Jackson, Leland B., *Digital Filters and Signal Processing*, Kluwer Academic Publishers, Norwell, Mass. 1987. Image is synthesized from the data inputs by steering the array to a predefined starting point in the image space, computing the range to each virtual array element from that image point, and then using time delay beamforming techniques such as taught in Van Veen, Barry D., and Buckley, Kevin M., *Beamforming: A Versatile Approach to Spatial Filtering*, IEEE ASSP magazine, pp. 4–22, Apr. 1988. Spatial shading coefficients are supplied by means of pregenerated look-up tables.

Figure 3:
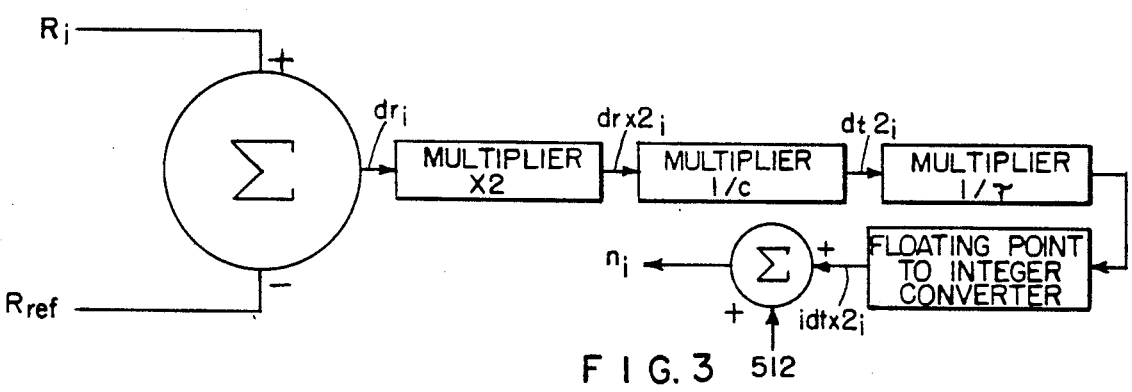
FIG. 3 shows an implementation of the digital delay computations.

FIG. 3 shows a process used to update the $i^{th}$ element of the steering vector. The center point of the radius of the arc described by placement of the virtual array elements is taken as fixed reference point 20. The slant range $R_i$ from the $i^{th}$ virtual element to the selected focal point, located at (fX, fY), is computed, i.e., $$R_i = \sqrt{(fX - X_i)^2 + (fY - Y_i)^2} \quad (4)$$

$R_i$ is then compared to the reference range $R_{ref}$ and the difference in length, labeled $dr_i$, is doubled to account for two way delay times for the difference in propagation path lengths. This range is identified as, $$drx2_i = 2.0(dr_i) \quad (5)$$

This difference, $drx2_i$, is converted to time (seconds) directly using the previously measured speed of sound "c" of the acoustic medium.

$$dt2_i = \frac{drx2_i}{c} \quad (6)$$

The effective sample period $\tau$, either real or interpolated, is then used to compute the integer number of samples (idtx2) with software corrections for truncation error.

$$idtx2_i = \frac{dt2_i}{\tau} \quad (7)$$

These delay times are then shifted toward positive time by an amount equal to one half the number of effective samples in the time gate in order to keep all of the time values positive which shift amount in the present case is 512 resulting in the steering vector $n_i$, $$n_i = idtx2_i + 512. \quad (8)$$

It is noted that other values of the shift amount may be selected without deviating from the scope and intent of the present invention.

The problem of maintaining phase coherence among channels is avoided by taking advantage of the controlled geometry of the test environment and the essentially unchanging sound propagation conditions in the transmission channel. This means that the propagation delays to all virtual array elements can be computed based directly on geometry while maintaining the required fractional wavelength phase coherence criteria set forth in Steinberg, Bernard D., *Microwave Imaging of Aircraft*, Proceedings of the IEEE, Vol. 76, No. 12, pp. 1578-1592 Dec. 1988.

Figure 4:
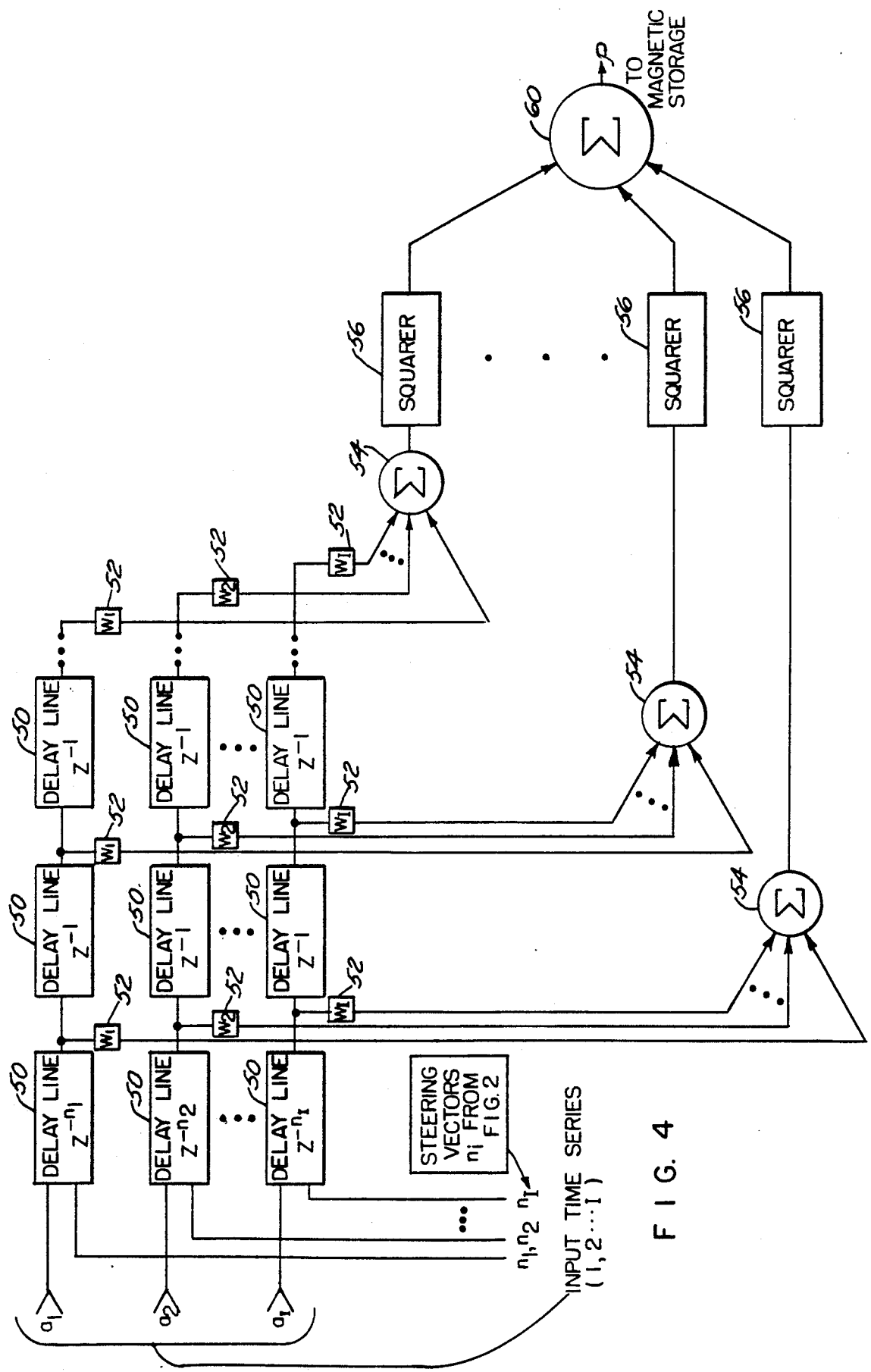
FIG. 4 shows an implementation of the time delay, summer and integrator portion of the present invention.

FIG. 4 shows signal flow from the received digital data inputs $a_i$ to the final output of the energy $\rho$ to magnetic storage. The prerecorded echo data $a_i$ from each virtual array element is time shifted by one of a plurality of delay lines 50 by an amount indicated by the steering vector, n. Spatial weighting $W_i$ is then applied to each signal by one of a plurality of weighters 52 and the results are summed in summers 54, squared in squarers 56, and all of the outputs of squarers 56 are integrated by integrator 60 over a predetermined interval S yielding a relative indication of the amount of energy received ($\rho$) from the selected focal point over the period of integration, $$\rho = \sum_{m=n_i}^{n_i+S-1} \left[ \sum_{i=1}^{I} Z^{-n_i} a_i W_i \right]^2 \quad (9)$$

where S represents the length (sample count) of integration, Z represents delay line 50, and $a_i$ represents the sampled echo data from the $i^{th}$ virtual hydrophone. The integer results $\rho$ are then recorded as a single word on magnetic media, the steering vector n is updated, and the process is repeated for every other focal point selected.

Finally, the image is displayed using simple raster scan and thresholding techniques. Color displays work best for this since the higher levels from target highlights can be readily isolated. However, even black and white hard photocopies often provide enough information to make highlight localization and classification possible.

The advantages of the present invention over the prior art are that the invention provides the capability for acoustic imaging in underwater acoustic test facilities using a minimal amount of redundant hardware. The invention also avoids the need for using adaptive beamformer techniques.

What has thus been described is an acoustic receiving array that is synthesized using a single stationary projector/receiver element and a rotating target. Echoes from a highly repeatable transmit pulse are digitized and recorded as the target is rotated. Controlled geometry and essentially stationary sound transmission channel characteristics eliminate the need for adaptive beamforming techniques. Subsequent to acquisition of the desired data set, conventional time delay beam-forming and steering techniques for multi-dimensional arrays are used to focus the array at desired locations. Energy level in a time gate is computed and recorded for each image location. Finally a raster image is generated using the thresholded energy levels.

Obviously many modifications and variations of the present invention may become apparent in light of the above teachings. For example: The technique may be used for imaging in a medium other than water or for imaging using non-acoustic waves or particles. The technique is also adaptable to combining various numbers of multiple real hydrophones as array elements. The invention can also use extended length synthesized arrays which surround or nearly surround the target. The necessary computations may be performed in software on a general purpose computer or by hardware. Steering of beams may be accomplished by means of look-up tables stored either in ROM or on magnetic media. Latent image spacing may be increased by using thinned synthetic array elements. Inverse synthetic array curvature may also be corrected using the present invention. Further, the array may be extended to the three dimensional case with corresponding three dimensional beam steering and imaging capabilities. The source may be mechanically excited and the resultant acoustic radiation pattern used to form the images. Substituting revolution of the acoustic transmit/receive pair about the target for the rotation of the target can also be used to supply the necessary data for imaging. Various and multiple bistatic sonar angles may be employed to improve target illumination and imaging performance. Pre-processing may also be done to provide acoustic clutter rejection prior to imaging. In addition, integration times may be varied to accommodate various transmitted waveforms.

In light of the above, it is therefore understood that within the scope of the appended claims, the invention may be practiced otherwise than as specifically described.

What is claimed is:

1. An underwater imaging system, comprising:
   transmitter/receiver means, positioned at the origin of an X-Y plane in a controlled environment, for generating and transmitting a series of acoustic pulses at preselected intervals and receiving reflected echoes of said pulses;
   a rotatable target, positioned at a point on said X-axis remote from said origin, for receiving said transmitted acoustic pulses and reflecting back said echoes of said pulses to said transmitter/receiver; and
   array synthesizing means, connected to said transmitter/receiver means, for processing said reflected echoes from said target and imaging said target therefrom using an inverse synthetic aperture array.

2. An imaging system according to claim 1 wherein said transmitter/receiver means further comprises:
   projector means for producing said acoustic pulses in a repeatable manner; and
   hydrophone, means, collocated with said projector means, for receiving said reflected echoes.

3. An imaging system according to claim 2 wherein said array synthesizing means further comprises:

a steering vector generating means for receiving a $R_{ref}$ and $R_i$ radius input for each image element i and producing steering vector $n_i$ therefrom; and
   acoustic energy measurement means, connected to said steering vector generating means, for receiving said vectors $n_i$ and input data $a_i$, said energy measurement means processing said $n_i$ and said $a_i$ so as to produce acoustic energy $\rho$ therefrom.

4. An imaging system according to claim 3 wherein said steering vector generating means further comprises:
   a subtractor, for subtracting said $R_{ref}$ from said $R_i$ to produce difference $dr_i$;
   a first multiplier, connected to said subtractor, for receiving said difference $dr_i$ and multiplying by two to produce $drx2_i$;
   a second multiplier, connected to said first multiplier, for receiving the output thereof and multiplying by 1/c to produce $d_i2i$;
   a third multiplier, connected to said second multiplier, for receiving the output thereof and multiplying by $1/\tau$;
   a floating point-to integer converter, connected to said third multiplier, for receiving the output thereof and producing the integer output $idtx2_i$ therefrom; and
   an adder, connected to said floating point-to integer converter, for adding a preselected shift amount thereto thereby producing said steering vectors $n_i$.

5. An imaging system according to claim 4 wherein said acoustic energy measurement means further comprises:
   a plurality of delay line means, each delay line means further comprising a plurality of serially connected delay lines, corresponding delay lines of each said i delay line means forming serial groups of i delay lines each, each said delay line means being connected to one of said input time series $a_i$ and to a corresponding said steering vector $n_i$, for producing a corresponding plurality of i delayed outputs from each said series group of i delay lines;
   a plurality of spatial weighting factor means, one each connected to each said serial group of i delay lines, for receiving the i outputs thereof and applying corresponding spatial weights $W_i$ thereto;
   a plurality of summers, one each connected to receive all said $W_i$ spatially weighted i outputs of each of said plurality of weighting factor means, for adding said weighted outputed together;
   a plurality of squarers, one each corresponding to one of said plurality of summers and conencted thereto, for squaring the output thereof; and
   an integrator means, connected to said plurality of squarers, for producing the energy output $\rho$ therefrom.

* * * * *